US012747308B2

(12) United States Patent
Wang et al.

(10) Patent No.: US 12,747,308 B2
(45) Date of Patent: Sep. 29, 2026

(54) IN-SITU REACTOR BLEND OF ZIEGLER-NATTA CATALYSED, NUCLEATED POLYPROPYLENE AND A METALLOCENE CATALYSED POLYPROPYLENE

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Emilia Tiitinen, Porvoo (FI)

(73) Assignee: BOREALIS AG, Vienna (AT)

( * ) Notice: Subject to any disclaimer, the term of this patent is extended or adjusted under 35 U.S.C. 154(b) by 471 days.

(21) Appl. No.: 18/253,143

(22) PCT Filed: Nov. 23, 2021

(86) PCT No.: PCT/EP2021/082568
§ 371 (c)(1),
(2) Date: May 16, 2023

(87) PCT Pub. No.: WO2022/106710
PCT Pub. Date: May 27, 2022

(65) Prior Publication Data
US 2024/0002555 A1 Jan. 4, 2024

(30) Foreign Application Priority Data
Nov. 23, 2020 (EP) .................................... 20209275

(51) Int. Cl.
*C08F 10/06* (2006.01)
*C08L 23/14* (2006.01)

(52) U.S. Cl.
CPC ............ *C08F 10/06* (2013.01); *C08L 23/142* (2013.01); *C08L 2205/025* (2013.01); *C08L 2205/035* (2013.01); *C08L 2205/24* (2013.01); *C08L 2308/00* (2013.01); *C08L 2314/02* (2013.01); *C08L 2314/06* (2013.01)

(58) Field of Classification Search
CPC .. C08F 10/06; C08F 2420/07; C08F 4/65912; C08F 4/65916; C08L 23/142; C08L 2205/025; C08L 2205/035; C08L 2205/24; C08L 2308/00; C08L 2314/02; C08L 2314/06
See application file for complete search history.

(56) References Cited

U.S. PATENT DOCUMENTS

| | | | | |
|---|---|---|---|---|
| 3,324,093 | A | 6/1967 | Alleman | |
| 3,374,211 | A | 3/1968 | Marwil et al. | |
| 3,405,109 | A | 10/1968 | Rohlfing | |
| 4,582,816 | A | 4/1986 | Miro | |
| 5,391,654 | A | 2/1995 | Ahvenainen et al. | |
| 2014/0128549 | A1 * | 5/2014 | Kheirandish ........... | C08L 23/10 525/240 |

FOREIGN PATENT DOCUMENTS

| | | | |
|---|---|---|---|
| CN | 102050906 | A | 5/2011 |
| CN | 107428877 | A | 12/2017 |
| CN | 107709382 | A | 2/2018 |
| CN | 109071722 | A | 12/2018 |
| EP | 0479186 | A | 8/1992 |
| EP | 0887379 | A | 12/1998 |
| EP | 0887380 | A | 12/1998 |
| EP | 0887381 | A | 12/1998 |
| EP | 891990 | B | 11/1999 |
| EP | 0991684 | A | 4/2000 |
| EP | 1310295 | A | 5/2003 |
| EP | 1415999 | A | 5/2004 |
| EP | 1591460 | B | 11/2005 |
| EP | 1860125 | B1 | 11/2007 |
| EP | 2415790 | B2 | 2/2012 |
| EP | 2535372 | A1 | 12/2012 |
| EP | 2610271 | B2 | 7/2013 |
| EP | 2610272 | B2 | 7/2013 |
| EP | 2610270 | B1 | 10/2015 |

(Continued)

OTHER PUBLICATIONS

Cromer (B. M. Cromer, et al, Melt mastication of isotactic polyproyplene for improved thermal and physical properties, Polymer Engineering & Science, Dec. 2019, 60(2):380-386).*

Gnani (M.H.A. Ghani, et al, The effects of entioxidants content on mechanical properties and water absorption behaviour of biocomposites prepared by single screw extrusion process, vol. 2014, Article ID 243078, 6 pages).*

Vincent Busico, et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.

Zhe Zhou, et al., "A new decoupling method for accurate quantification of polyethylene copolymer composition and triad sequence distribution with 13C NMR" Journal of Magnetic Resonance 187 (2007) 225-233.

(Continued)

*Primary Examiner* — Kumar R Bhushan

(74) *Attorney, Agent, or Firm* — Tarolli, Sundheim, Covell & Tummino LLP

(57) ABSTRACT

A process for the preparation of isotactic propylene polymer compositions involving the polymerisation of propylene and optionally one or more comonomers selected from ethylene and α-olefins containing 4 to 12 carbon atoms in one or more reaction steps in the present of a catalyst system comprising 45 to 99 wt.-% of a metallocene catalyst and 1 to 55 wt.-% of a Ziegler Natta catalyst having a non-phthalate internal donor and having been prepolymerised with a monomer (I) of the general formula $CH_2{=}CH{-}CHR^1R_2$ (I) wherein $R^1$ and $R^2$ are either individual alkyl groups with one or more carbon atoms or form an optionally substituted saturated, unsaturated or aromatic ring or a fused ring system containing 4 to 20 carbon atoms.

18 Claims, 1 Drawing Sheet

(56) References Cited

FOREIGN PATENT DOCUMENTS

| | | | |
|---|---|---|---|
| EP | 3242150 | A | 11/2017 |
| JP | 2016023268 | A | 2/2016 |
| WO | 1992/012182 | A1 | 7/1992 |
| WO | 94/14856 | A1 | 7/1994 |
| WO | 95/12622 | A1 | 5/1995 |
| WO | 1996/011218 | A1 | 4/1996 |
| WO | 1997/033920 | A1 | 9/1997 |
| WO | 1998/058977 | A1 | 12/1998 |
| WO | 1999/024478 | A1 | 5/1999 |
| WO | 1999/024479 | A1 | 5/1999 |
| WO | 2000/021656 | A1 | 4/2000 |
| WO | 2000/068315 | A1 | 11/2000 |
| WO | 02/02576 | A1 | 1/2002 |
| WO | 2004/000899 | A1 | 12/2003 |
| WO | 2004/111095 | A1 | 12/2004 |
| WO | 2006/097497 | A1 | 9/2006 |
| WO | 2007/116034 | A1 | 10/2007 |
| WO | 2011/076780 | A1 | 6/2011 |
| WO | 2011/135004 | A1 | 11/2011 |
| WO | 2012/001052 | A1 | 1/2012 |
| WO | 2012/007430 | A1 | 1/2012 |
| WO | 2012/084961 | A1 | 6/2012 |
| WO | 2012/0171745 | A1 | 12/2012 |
| WO | 2015/158790 | A1 | 10/2015 |
| WO | WO2016091679 | A1 | 6/2016 |
| WO | 2017/148970 | A1 | 9/2017 |
| WO | 2018/122134 | A1 | 7/2018 |
| WO | 2019/052820 | A1 | 3/2019 |
| WO | 2019/179959 | A1 | 9/2019 |
| WO | 2020/088996 | A1 | 5/2020 |

OTHER PUBLICATIONS

Vincent Busico, et al., "Full Assignment of the 13C NMR Spectra of Regioregular Polypropylenes: Methyl and Methylene Region", Macromolecules 1997, 30, 6251-6263.

Vincent Busico, et al., "Microstructure of polypropylene" Prog. Polym. Sci 26 (2001) 443-533.

Gurmeet Singh, et al., "Triad sequence determination of ethylene-propylene copolymers—application of quantitative 13C NMR" Polymer Testing 28 (2009) 475-479.

H.N. Cheng, "13C NMR Analysis of Ethylene-Propylene Rubbers", Macromolecules 1984, 17, 1950-1955.

Resconi, Luigi, et al. "Selectivity in Propene Polymerization with Metallocene Catalysts" Chem Rev. 2000, 100, 1253-1345.

Wen-Jun Wang, et al., "Structural Analysis of Ethylene/Propylene Copolymers Synthesized with a Constrained Geometry Catalyst" Macromolecules 2000, 33, 1157-1162.

European Application No. 20209275.5 Search Report May 20, 2021.

Chinese Application No. 202180077168.0, Office Action dated Jul. 30, 2025.

Chinese Application No. 202180077168.0, Office Action dated Sep. 25, 2024.

Chinese Application No. 202180077168.0, Office Action dated Feb. 3, 2026.

* cited by examiner

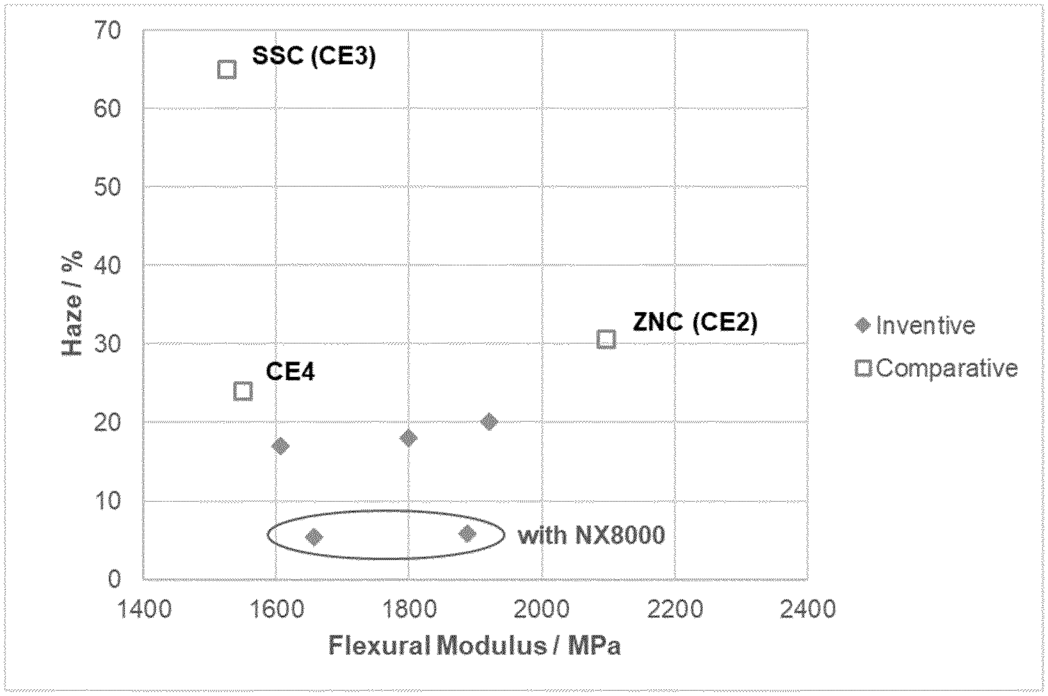
Figure 1: Balance of Haze and Stiffness properties
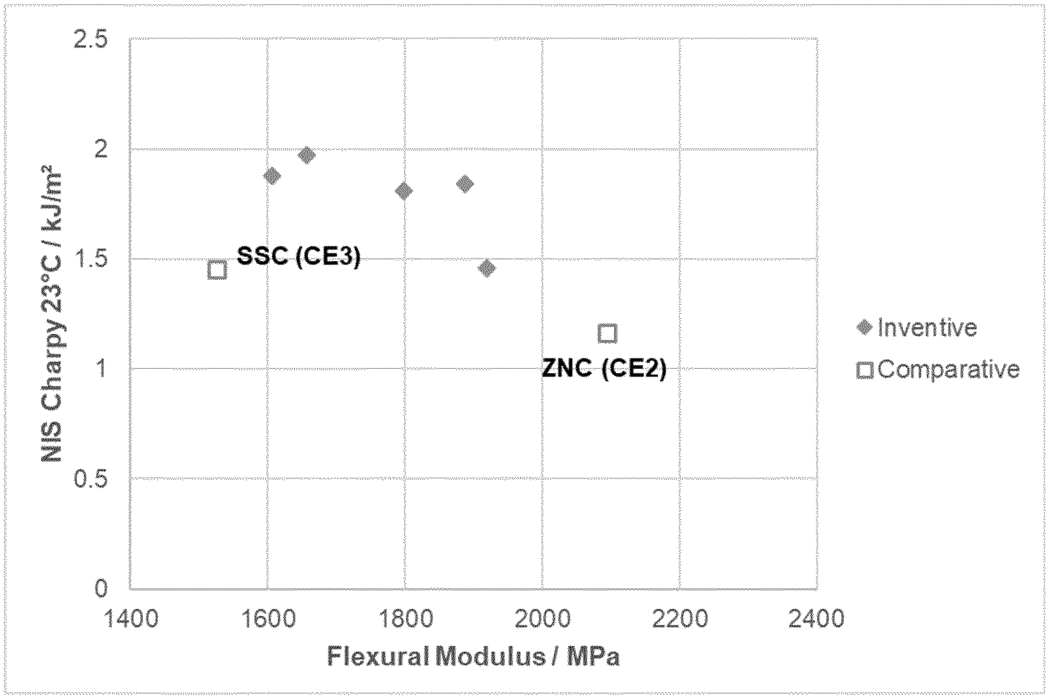
Figure 2: Balance of Impact Strength and Stiffness properties

IN-SITU REACTOR BLEND OF ZIEGLER-NATTA CATALYSED, NUCLEATED POLYPROPYLENE AND A METALLOCENE CATALYSED POLYPROPYLENE

The present invention is related to a process for the preparation of isotactic propylene polymer compositions wherein a catalyst blend of a phthalate-free Ziegler Natta catalyst and supported metallocene catalyst are employed, isotactic propylene polymer compositions resulting from the process, and the use of the catalyst blend for synthesizing isotactic propylene polymer compositions.

BACKGROUND TO THE INVENTION

Polypropylene has become one of the most widely used polymers due to its good combination of properties, which makes it useful for applications ranging from food packaging (film, bottle) to more demanding applications like pipes, fittings or foams.

For these different applications, polymers with very different properties are required. The main characteristics of these polymers are their isotacticity, on which stiffness is greatly dependent, melt flow rate (MFR), and molecular weight and the molecular weight distribution (MWD), which strongly affect processability. These features can be controlled by varying the process conditions and by using different catalyst systems.

The use of Ziegler-Natta type catalysts containing as essential components magnesium, titanium and halogen and metallocene catalysts for the polymerisation of propylene is well established in the art.

Numerous documents describe the use of Ziegler-Natta type catalysts either alone or more conventionally supported on a carrier, e.g. an oxide support such as silica or alumina. Such supported catalyst systems are normally used with a metal alkyl co-catalyst and in the presence of a compound acting as external donor as is well known in the art.

Metallocene catalysts are also widely employed and are conventionally used in combination with a co-catalyst as is well known in the art.

Metallocene catalysts used in the production of propylene homo- or copolymers generally offer good flexibility over chain structure and consequently, the crystalline structure of the polypropylene products. They furthermore offer remarkable hydrogen response leading to a final melt flow rate (MFR) range, especially in the higher melt flow ends, that are not achievable using traditional Ziegler-Natta catalysts. This feature is especially desirable in addressing the problem of reducing organoleptic levels and taste and odour, but can also be a problem for products requiring low melt flow rates, like pipes.

A further problem related to metallocene-catalysed polypropylenes is that they usually have weak processability due to their narrow molecular weight distribution and inferior mechanical properties compared to Ziegler-Natta catalysed products.

It is also known to combine different catalysts to form multi-site, like dual-site catalyst systems or mixed catalyst systems. Such catalyst systems offer the skilled polymer chemist more scope for tailoring the properties of the polymer product since each site within such a catalyst may give rise to a polymer component having particular properties, e.g. desired mechanical or optical properties. For example dual-site or mixed catalyst systems are used in order to achieve a broad multimodal, like bimodal molecular weight distribution in the final polymer product. Such a distribution is desirable as the higher molecular weight component contributes to the strength of the end-products made from the polymer while the lower molecular weight component contributes to the processability of the polymer.

However, the use of "mixed" catalyst systems is often associated with operability problems. For example, the use of two catalysts on a single support may be associated with a reduced degree of process control flexibility. Moreover, the two different catalyst/co-catalyst systems may interfere with one another—for example, the external donor component, which is often used in Ziegler-Natta catalyst systems, may "poison" a metallocene catalyst.

Accordingly, a "mixed catalyst" process that avoids or at least mitigates some of these difficulties would be a useful addition to the art.

Thus, there exists a need to maximize the benefits of each individual catalyst system (i.e. Ziegler-Natta and metallocene).

A further possibility to achieve the desired molecular weight and MWDs is blending of two or more polypropylenes or alternatively by multi-stage polymerisation.

Several multistage processes for the polymerisation of olefins, carried out in two or more reactors, are known from the patent literature and are of particular interest in industrial practice, due to the possibility of independently varying, in any reactor, process parameters such as temperature, pressure, type and concentration of monomers, concentration of hydrogen or other molecular weight regulators. In combination with the use of different catalyst systems, this provides much greater flexibility in controlling the composition and properties of the end-product than with single-stage processes.

Processes in several stages find application for example in the preparation of olefin (co)polymers with broad molecular weight distribution (MWD), by producing polymer species with different molecular weight in the various reactors.

For example, WO 96/11218 discloses a multistage process for the polymerisation of one or more than one olefin of the formula $CH_2{=}CHR$ in which R can be alkyl having 1-10 carbon atoms. In the first polymerisation stage one or more than one such olefin is or are polymerised by Ziegler-Natta catalysis to form particles of a first polymer. In the next polymerisation stage, a polymer of one or more than one such olefin is formed by metallocene catalysis on or in the particles of the first polymer, whereby the first catalyst is deactivated prior to the introduction of the second catalyst system. The transition between the two stages however makes the overall process very time-consuming and cost intensive.

Specifically, the process described in WO 96/11218 comprises a first stage in which a propylene polymer is produced in the presence of a titanium or vanadium catalyst, a second stage in which the titanium or vanadium catalyst is deactivated, and a third stage in which polymerisation is continued in the presence of a metallocene catalyst. Such a cascade process is believed to result in good homogenisation of the resulting polymer blend. However, the need to deactivate the first catalyst before the polymer particles can be impregnated with the second catalyst makes this process unnecessarily complex and not cost effective. A further disadvantage of this process is that the second catalyst is relatively quickly flushed out of the reactor as a result of the high throughput of polymer material into the third stage of the polymerisation process.

Although much development has been done in the field of polymerising propylene to yield polypropylene compositions with improved polymer property profile, it was impossible up to now to provide propylene homo- or copolymers with improved balance between optical properties, mechanical properties, thermal properties and processing properties.

For this reason there is still a need for propylene homo- or copolymer compositions, which fulfil the various demanding requirements in many end application areas of polymers, such as packaging, including food and medical packaging, fibres, pipe and automobile industry, thus showing the desired excellent balance between optical properties, mechanical properties, thermal properties and processing properties.

In particular, a balance between the haze properties and the stiffness of polypropylenes can be difficult to achieve, especially at high melt flow rates (i.e. low molecular weight). It is furthermore not straightforward to synthesize heterophasic propylene copolymers with very high melt flow rates, since the hydrogen response of the catalysts during the polymerisation of the crystalline matrix is often poor. Catalysts or catalyst blends having improved hydrogen response, in addition to the other beneficial properties are thus advantageous.

BRIEF DESCRIPTION OF THE DRAWINGS

FIG. 1 shows the balance between haze and stiffness properties for the comparative and inventive examples.

FIG. 2 shows the balance between impact strength and stiffness properties for the comparative and inventive examples.

SUMMARY OF THE INVENTION

The present invention is based upon the finding that a catalyst blend of metallocene catalyst with a phthalate-free Ziegler-Natta-type catalyst composition that has been modified with a polymeric nucleating agent can achieve the above goals with regard to balance of mechanical and optical properties and hydrogen response.

The present invention is directed to a process for the preparation of isotactic propylene polymer compositions comprising the steps of:

(a) prepolymerising a Ziegler-Natta type catalyst comprising a magnesium halide support, a titanium component and an internal donor (ID), wherein the internal donor is other than a phthalic ester and the Ziegler-Natta type catalyst is free from phthalic esters, in the presence of an aluminium alkyl co-catalyst and an external donor (ED), with a monomer (I) of the general formula $$CH_2{=}CH{-}CHR^1R^2 \quad (1)$$

wherein $R^1$ and $R^2$ are either individual alkyl groups with one or more carbon atoms or form an optionally substituted saturated, unsaturated or aromatic ring or a fused ring system containing 4 to 20 carbon atoms to obtain a catalyst composition (II) comprising 25 to 95 wt.-% of an isotactic polymer based on said monomer (I);

(b) mixing said catalyst composition (II) with a supported metallocene catalyst (III) suitable for the production of isotactic polypropylene in a weight ratio (II):(III) of 1:99 to 55:45 in an inert medium to obtain a catalyst blend (IV);

(c) using said catalyst blend (IV) for polymerising propylene and optionally one or more comonomers selected from ethylene and α-olefins containing 4 to 12 carbon atoms in one or more reaction steps to obtain an isotactic propylene homo- or copolymer (V);

(d) melt-mixing said isotactic propylene homo- or copolymer (V) with additives like antioxidants and acid scavengers and optionally a nucleating agent, followed by pelletisation.

The present invention is further directed to an isotactic propylene polymer composition produced in a process according to the present invention.

In another aspect, the present invention is directed to a film or molded article comprising at least 95 wt,-% of an isotactic propylene polymer composition according to the present invention.

In an additional aspect, the present invention is directed to a use of a catalyst mixture comprising:

(a) 45 to 95 wt.-%, relative to the total weight of the catalyst mixture, of a metallocene catalyst (III) comprising (i) a metallocene complex of the general formula (VI)

Formula (VI)

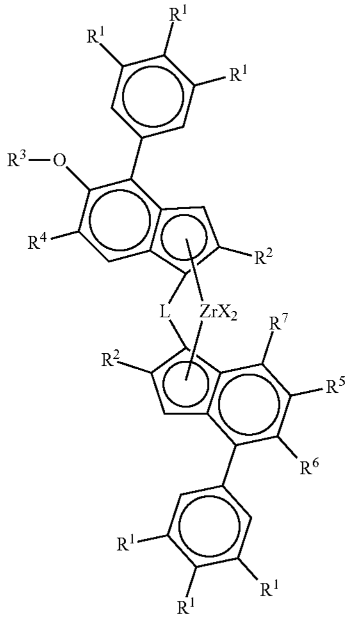

wherein each X independently is a sigma-donor ligand, L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms from groups 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a $CH_2$—$R^8$ group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a $C(R^9)_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table;

$R^6$ is hydrogen or an aliphatic $C_1$-$C_{20}$-hydrocarbyl group optionally containing one or more heteroatoms from groups 14-16 of the periodic table; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl group optionally containing one or more heteroatoms belonging to groups 14-16 of the periodic table;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a co-catalyst system comprising a boron containing co-catalyst and/or an aluminoxane co-catalyst, and (iii) a silica support, and (b) 5 to 55 wt.-%, relative to the total weight of the catalyst mixture, of a Ziegler-Natta-type catalyst composition (II), comprising i) a Ziegler-Natta type catalyst, comprising a magnesium halide support, a titanium component and an internal donor (ID), wherein the internal donor is other than a phthalic ester and the Ziegler-Natta type catalyst is free from phthalic esters;

ii) an aluminium alkyl co-catalyst;

iii) an external donor (ED)

wherein the Ziegler-Natta catalyst composition has been modified by polymerising a monomer (I) of the general formula $$CH_2{=}CH{-}CHR^1R^2 \quad (I)$$

wherein $R^1$ and $R^2$ are either individual alkyl groups with one or more carbon atoms or form an optionally substituted saturated, unsaturated or aromatic ring or a fused ring system containing 4 to 20 carbon atoms, such that the Ziegler-Natta-type catalyst composition (II) contains from 25 to 95 wt.-% of an isotactic polymer based on said monomer (I)

for the production of an isotactic propylene homo- or copolymer composition having one or more, preferably all, of the following properties:

(i) a melt flow rate $MFR_2$ determined according to ISO 1133 at 230° C. and 2.16 kg load in the range of 5 to 500 g/10 min, (ii) a comonomer content of up to 6.0 wt.-%, the comonomer preferably being ethylene, (iii) an isotactic pentad regularity <mmmm> determined by $^{13}C$-NMR spectroscopy in the range of 96.0 to 99.9%, (iv) a 2,1-regiodefect content in the range of 0.2 to 1.2 mol.-%, and (v) a xylene cold soluble (XCS) content as determined at 25° C. according to ISO 16152 in the range of 0.9 to 9.0 wt.-%.

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

A polymer blend is meant as a mixture of two or more polymeric components. In general, the blend can be prepared by mixing the two or more polymeric components. Suitable mixing procedures known in the art are post-polymerisation blendings and in-situ blending during the polymerisation process. Post-polymerisation blendings can be dry-blendings of polymeric components such as polymer powders and/or compounded polymer pellets or melt blending by melt mixing the polymeric components. During in-situ blending, the polymeric components may be produced in different stages of a multistage polymerisation process and are blended by polymerising one polymeric component in the presence of another polymeric component polymerised in a prior stage (in the case that the catalyst used for each component is the same. If the catalyst used for the two components is not the same, as is the case in the present invention, then in-situ blending is achieved through the use of a catalyst blend, comprising more than one catalyst.

A propylene homopolymer is a polymer that essentially consists of propylene monomer units. Due to impurities especially during commercial polymerisation processes, a propylene homopolymer can comprise up to 0.1 mol-% comonomer units, preferably up to 0.05 mol-% comonomer units and most preferably up to 0.01 mol-% comonomer units.

A propylene random copolymer is a copolymer of propylene monomer units and comonomer units, preferably selected from ethylene and C4-C12 alpha-olefins, in which the comonomer units are distributed randomly over the polymeric chain. The propylene random copolymer can comprise comonomer units from one or more comonomers different in their amounts of carbon atoms. In the following amounts are given in % by weight (wt.-%) unless it is stated otherwise.

Typical for propylene homopolymers and propylene random copolymers is the presence of only one glass transition temperature.

The isotacticity of a polymer is an indication of the stereoregularity of the stereogenic centres introduced during the polymerisation process. In a 100% isotactic polypropylene, all stereogenic centres would have the same configuration. Isotacticity is generally quantified by the meso pentad concentration [mmmm], expressed as a percentage. Isotactic polymers typically have a mesopentad concentration of at least 90%, more preferably at least 95%, more preferably at least 98%.

DETAILED DESCRIPTION OF THE INVENTION

The Ziegler-Natta Catalyst Composition (II)

The Ziegler-Natta catalyst composition (II) according to the present invention is formed by prepolymerising a Ziegler-Natta type catalyst (ZN-C) comprising a magnesium halide support, a titanium component and an internal donor (ID), wherein the internal donor is other than a phthalic ester and the Ziegler-Natta type catalyst is free from phthalic esters, in the presence of an aluminium alkyl co-catalyst and an external donor (ED), with a monomer (I) of the general formula $$CH_2{=}CH{-}CHR^1R^2 \quad (I)$$

wherein $R^1$ and $R^2$ are either individual alkyl groups with one or more carbon atoms or form an optionally substituted saturated, unsaturated or aromatic ring or a fused ring system containing 4 to 20 carbon atoms to obtain a catalyst composition (II) comprising 25 to 95 wt.-% of an isotactic polymer based on said monomer (I).

The Ziegler-Natta type catalyst (ZN-C) comprises a magnesium halide support, a titanium component and an internal donor (ID).

The titanium component and the internal donor (ID) are further defined above and below.

The magnesium halide support may be any magnesium halide component. The use of the term "support" simply indicates that the magnesium halide component supports the active titanium centre on a molecular level. The person skilled in the art would be aware that Ziegler-Natta type catalysts may be classed as supported or self-supporting catalysts. The term "supported catalyst" refers to catalysts wherein the magnesium halide support is an external support material, provided as a magnesium halide per se. Self-supported catalysts, for example those described in WO 2017/148970 A1, may be produced from starting materials that do not contain magnesium halides; however, in all cases, a magnesium halide, i.e. the magnesium halide support as required by the present invention, will be formed during the formation of the Ziegler-Natta type catalyst, usually from the reaction between the magnesium-containing starting material and a titanium halide. Thus, the person skilled in the art would understand that the use of the term "support" in "magnesium halide support" is not intended to limit the invention to Ziegler-Natta type catalysts having external support materials. Indeed, it is preferred that the Ziegler-Natta type catalyst is free from any external support material, i.e. the catalyst is self-supported. Suitable self-supported catalysts are described, for example, in WO 2017/148970 A1.

The Ziegler-Natta type catalyst (ZN-C) can be further defined by the way it is obtained.

Accordingly, the Ziegler-Natta type catalyst (ZN-C) is preferably obtained by a process comprising the steps of a)
 $a_1$) providing a solution of at least a magnesium alkoxy compound (Ax) being the reaction product of magnesium and an alcohol (A) comprising in addition to the hydroxyl moiety at least one ether moiety optionally in an organic liquid reaction medium;
 or
 $a_2$) a solution of at least magnesium alkoxy compound (Ax') being the reaction product of a magnesium compound (MC) and an alcohol mixture of the alcohol (A) and a monohydric alcohol (B) of formula ROH, optionally in an organic liquid reaction medium;
 or
 $a_3$) providing a solution of a mixture of the magnesium alkoxy compound (Ax) and a magnesium alkoxy compound (Bx) being the reaction product of a magnesium compound (MC) and the monohydric alcohol (B), optionally in an organic liquid reaction medium; and b) adding said solution from step a) to a titanium component and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta type catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition, a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The titanium component is most preferably a titanium halide, like $TiCl_4$.

The internal donor (ID) used in the preparation of the catalyst used in the present invention is preferably a (di)ester of a non-phthalic carboxylic (di)acid, more preferably a diester of mono-unsaturated dicarboxylic acids, such as a maleate, citraconate, or cyclohexene-1,2-dicarboxylate, most preferably is citraconate.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta type catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP 2 415 790, EP 2 610 270, EP 2 610 271 and EP 2 610 272 which are incorporated here by reference.

The prepolymerisation of the Ziegler-Natta type catalyst with the monomer (I) is carried out in the presence of an aluminium alkyl co-catalyst and an external donor (ED) Suitable external donors (ED) include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are $(tert\text{-}butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably, both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor), the latter especially preferred.

In addition to the Ziegler-Natta type catalyst (ZN-C) and the external donor (ED) a co-catalyst is used in the prepolymerisation step a). The co-catalyst is an aluminum compound, preferably an aluminum alkyl, aluminum halide or aluminum alkyl halide compound.

Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment, the co-catalyst (Co) is triethylaluminium (TEAL).

Advantageously, the triethyl aluminium (TEAL) has a hydride content, expressed as $AlH_3$, of less than 1.0 wt.-% with respect to the triethyl aluminium (TEAL). More preferably, the hydride content is less than 0.5 wt.-%, and most preferably the hydride content is less than 0.1 wt.-%.

Preferably the ratio between the co-catalyst (Co) and the external donor (ED) [Co/ED] and/or the ratio between the co-catalyst (Co) and the titanium component (TC) [Co/TC] should be carefully chosen.

Accordingly, (a) the mol-ratio of co-catalyst (Co) to external donor (ED) [Co/ED] preferably is in the range of 5 to 45, preferably is in the range of 5 to 35, more preferably is in the range of 5 to 25; and optionally (b) the mol-ratio of co-catalyst (Co) to titanium component (TC) [Co/TC] preferably is in the range of above 80 to 500, preferably is in the range of 100 to 450, still more preferably is in the range of 120 to 350.

As described above, the Ziegler-Natta type catalyst (ZN-C) is prepolymerised with a monomer (I) of the general formula $$CH_2{=}CH{-}CHR^1R^2 \quad (I)$$

wherein $R^1$ and $R^2$ are either individual alkyl groups with one or more carbon atoms or form an optionally substituted saturated, unsaturated or aromatic ring or a fused ring system containing 4 to 20 carbon atoms.

In a preferred embodiment, monomer (I) is selected from vinyl cyclohexane, vinyl cyclopentane and 4-methylpent-1-ene.

A particularly preferred embodiment of the catalyst modification comprises the following steps:

introducing a Ziegler-Natta type catalyst (ZN-C), as described above into the reaction medium, adding the co-catalyst (Co) and the external donor (ED), feeding monomer (I) to the agitated reaction medium at a weight ratio of 0.33 to 20, preferably 0.33 to 10, monomer (I)/catalyst, subjecting the vinyl compound to a polymerisation reaction in the presence of said Ziegler-Natta type catalyst (ZN-C), co-catalyst (Co) and external donor (ED) at a temperature of 35 to 65° C., and continuing the polymerisation reaction until a maximum concentration of the unreacted monomer (I) of less than 2000, preferably less than 1000 ppm by weight, is obtained, yielding a modified Ziegler-Natta catalyst system containing up to 20 grams of vinyl compound per one gram of solid catalyst.

The modified Ziegler-Natta catalyst system (II) comprises from 25 to 95 wt.-% of an isotactic polymer based on monomer (I), more preferably from 50 to 90 wt.-% of an isotactic polymer based on monomer (I), most preferably from 60 to 80 wt.-% of an isotactic polymer based on monomer (I).

The modification of the Ziegler-Natta procatalyst is carried out essentially before any contacting with the metallocene catalyst system and thus before any prepolymerisation of the catalyst mixture with the olefinic monomer, i.e. propylene.

Prepolymerisation here means a conventional, usually continuous process step performed prior to the main polymerisation step(s), wherein the catalyst, in case of the invention the catalyst mixture, is polymerised with propylene to a minimum degree of 10 g, preferably of at least 100 g polypropylene and more preferably of at least 500 g polypropylene per 1 g catalyst mixture.

By carrying out the modification of the Ziegler-Natta catalyst essentially before contacting it with the metallocene catalyst system and before contacting the mixture with propylene, it can be ensured that the polymerisation reaction of the vinyl compound is complete under the reaction conditions observed.

Concerning the modification of catalyst, reference is made to the international applications WO 99/24478, WO 99/24479 and particularly WO 00/68315, incorporated herein by reference with respect to the reaction conditions concerning the modification of the catalyst as well as with respect to the polymerisation reaction.

This method is also known as *Borealis* Nucleation Technology (BNT).

Due to this advantageous way of Ziegler-Natta catalyst modification it is possible to perform the subsequent polymerisation steps without the addition of any additional external donor and additional co-catalyst to the prepolymerisation step and to any subsequent polymerisation step(s), like bulk polymerisation and/or gas phase polymerisation. Only the amount of external donor and co-catalyst used during the catalyst preparation of the nucleated Ziegler-Natta catalyst is used.

The metallocene catalyst (III) The metallocene catalyst according to the present invention may be any supported metallocene catalyst suitable for the production of isotactic polypropylene.

It is preferred that the metallocene catalyst (III) comprises a metallocene complex, a co-catalyst system comprising a boron-containing co-catalyst and/or aluminoxane co-catalyst, and a silica support.

In particular, it is preferred that the metallocene catalyst (III) comprises (i) a metallocene complex of the general formula (VI)

Formula (VI)

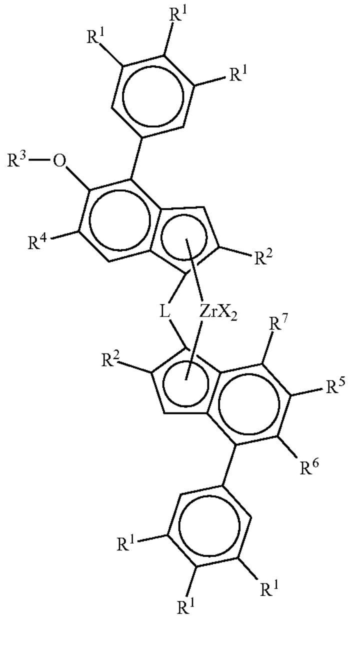

wherein each X independently is a sigma-donor ligand,

L is a divalent bridge selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom or a $C_1$-$C_{20}$-hydrocarbyl group optionally containing one or more heteroatoms from groups 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a $CH_2$—$R^8$ group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a $C(R^9)_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table;

$R^6$ is hydrogen or an aliphatic $C_1$-$C_{20}$-hydrocarbyl group optionally containing one or more heteroatoms from groups 14-16 of the periodic table; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl group optionally containing one or more heteroatoms belonging to groups 14-16 of the periodic table;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a co-catalyst system comprising a boron containing co-catalyst and/or an aluminoxane co-catalyst, and (iii) a silica support.

The term "sigma-donor ligand" is well understood by the person skilled in the art, i.e. a group bound to the metal via a sigma bond. Thus the anionic ligands "X" can independently be halogen or be selected from the group consisting of R', OR', $SiR'_3$, $OSiR'_3$, $OSO_2CF_3$, OCOR', SR', $NR'_2$ or $PR'_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiment the anionic ligands "X" are identical and either halogen, like Cl, or methyl or benzyl.

A preferred monovalent anionic ligand is halogen, in particular chlorine (Cl).

More preferably, the metallocene catalyst has the formula (VIa)

(VIa)

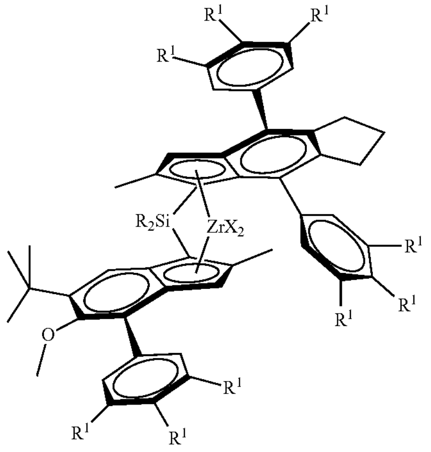

wherein each $R^1$ are independently the same or can be different and are hydrogen or a linear or branched $C_1$-$C_6$ alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

Most preferably, X is chlorine, benzyl or a methyl group. Preferably, both X groups are the same. The most preferred options are two chlorides, two methyl or two benzyl groups, especially two chlorides.

Preferred complexes of the metallocene catalyst include:

rac-dimethylsilanediylbis[2-methyl-4-(3',5'-dimethylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-(4'-tertbutylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-phenyl-5-methoxy-6-tert-butylinden-1-yl] zirconium dichloride, rac-anti-dimethylsilanediyl[2-methyl-4-(3',5'-tert-butylphenyl)-1,5,6,7-tetrahydro-sindacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(4'-tert-butylphenyl)-1,5,6,7-tetrahydro-sindacen-1-yl][2-methyl-4-(3',5'-dimethyl-phenyl)-5-methoxy-6-tert-butylinden-1-yl]zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-dimethylphenyl)-5-methoxy-6-tert-butylinden-1-yl]zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-5 ditert-butyl-phenyl)-5-methoxy-6-tert-butylinden-1-yl]zirconium dichloride.

Especially preferred is rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tertbutylinden-1-yl] zirconium dichloride (VIb)

(VIb)

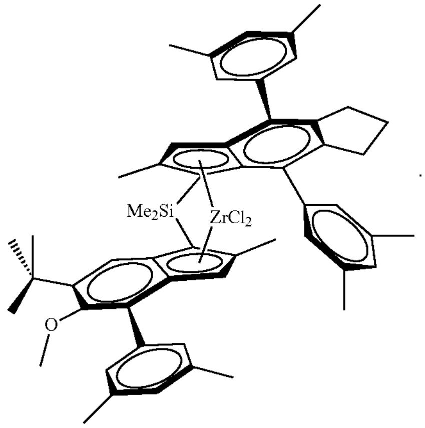

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO 2002/02576, WO 2011/135004, WO 2012/084961, WO 2012/001052, WO 2011/076780, WO 2015/158790 and WO 2018/122134. Especially reference is made to WO 2019/179959, in which the most preferred catalyst of the present invention is described.

According to the present invention a co-catalyst system comprising a boron containing co-catalyst and/or an aluminoxane co-catalyst is used in combination with the above defined metallocene catalyst complex.

The aluminoxane co-catalyst can be one of formula (VII):

(VII)

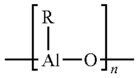

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$ cycloalkyl, $C_7$-$C_{12}$ arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (III).

The preferred aluminoxane is methylaluminoxane (MAO). Since the aluminoxanes used as co-catalysts according to the invention are not, owing to their mode of preparation, pure compounds, the molarity of aluminoxane solutions hereinafter is based on their aluminium content.

According to the present invention, also a boron containing co-catalyst can be used instead of the aluminoxane co-catalyst or the aluminoxane co-catalyst can be used in combination with a boron containing co-catalyst.

It will be appreciated by the person skilled in the art that where boron based co-catalysts are employed, it is normal to pre-alkylate the complex by reaction thereof with an aluminium alkyl compound, such as TIBA. This procedure is well known and any suitable aluminium alkyl, e.g. $Al(C_1$-$C_6$ alkyl$)_3$ can be used. Preferred aluminium alkyl compounds are triethylaluminium, tri-isobutylaluminium, tri-isohexylaluminium, tri-n-octylaluminium and tri-isooctylaluminium.

Alternatively, when a borate co-catalyst is used, the metallocene catalyst complex is in its alkylated version, that is for example a dimethyl or dibenzyl metallocene catalyst complex can be used.

Boron based co-catalysts of interest include those of formula (VIII)

$BY_3$ (VIII)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris(3,4,5-trifluorophenyl)borane.

Particular preference is given to tris(pentafluorophenyl)borane.

However it is preferred that borates are used, i.e. compounds containing a borate 3+ ion. Such ionic co-catalysts preferably contain a non-coordinating anion such as tetrakis(pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate, triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

It has been surprisingly found that certain boron co-catalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

According to the present invention, the preferred co-catalysts are aluminoxanes, more preferably methylaluminoxanes, combinations of aluminoxanes with Al-alkyls, boron or borate co-catalysts, and combination of aluminoxanes with boron-based co-catalysts.

Suitable amounts of co-catalyst will be well known to the person skilled in the art. The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The person skilled in the art is aware of the procedures required to support a metallocene catalyst.

Especially preferably, the support is a porous material so that the complex may be loaded into the pores of the support, e.g. using a process analogous to those described in WO94/14856 (Mobil), WO95/12622 (*Borealis*) and WO2006/097497.

The average particle size of the silica support can be typically from 10 to 100 m. However, it has turned out that special advantages can be obtained if the support has a median particle size d50 from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The Catalyst Blend (IV)

The catalyst blend (IV) of the present invention is a blend of catalyst composition (II) and supported metallocene catalyst (III). Consequently all preferable embodiments as described in the sections above that detail these components, apply mutatis mutandis for the catalyst blend (IV).

The weight ratio of catalyst composition (II) and supported metallocene catalyst (III) in the catalyst blend (IV) is in the range from 1:99 to 55:45, more preferably in the range from 5:95 to 50:50, yet more preferably in the range from 5:95 to 40:60, even more preferably in the range from 10:90 to 40:60, most preferably in the range from 20:80 to 35:65.

It is preferred that the catalyst blend (IV) contains no further components that are catalytically active for the polymerisation of propylene, beyond the catalyst composition (II) and the supported metallocene catalyst (III) as described above.

In one embodiment, the catalyst blend (IV) consists of the catalyst composition (II) and the supported metallocene catalyst (III). The person skilled in the art would understand that the construction "consisting of" in the context of the catalyst blend (IV) would not exclude the presence of waxes and oils, which are typically added to catalyst compositions for storage and transport, as well as facilitating their addition into continuous polymerisation processes.

Consequently, it is preferred that the catalyst blend (IV) comprises from 1 to 55 wt.-%, relative to the total weight of the catalyst blend (IV), of catalyst composition (II) and from 45 to 99 wt.-%, relative to the total weight of the catalyst blend (IV), of the supported metallocene catalyst (III).

More preferably, the catalyst blend (IV) comprises from 5 to 50 wt.-%, relative to the total weight of the catalyst blend (IV), of catalyst composition (II) and from 50 to 95 wt.-%, relative to the total weight of the catalyst blend (IV), of the supported metallocene catalyst (III).

Yet more preferably, the catalyst blend (IV) comprises from 5 to 40 wt.-%, relative to the total weight of the catalyst blend (IV), of catalyst composition (II) and from 60 to 95 wt.-%, relative to the total weight of the catalyst blend (IV), of the supported metallocene catalyst (III).

Even more preferably, the catalyst blend (IV) comprises from 10 to 40 wt.-%, relative to the total weight of the catalyst blend (IV), of catalyst composition (II) and from 60 to 90 wt.-%, relative to the total weight of the catalyst blend (IV), of the supported metallocene catalyst (III).

Most preferably, the catalyst blend (IV) comprises from 20 to 35 wt.-%, relative to the total weight of the catalyst blend (IV), of catalyst composition (II) and from 65 to 80 wt.-%, relative to the total weight of the catalyst blend (IV), of the supported metallocene catalyst (III).

The person skilled in the art would understand that, when calculating the amount of catalyst composition (II) and supported metallocene catalyst (III) present in the catalyst blend (IV), any amounts of non-catalytic diluents, in particular waxes and oils, are to be disregarded for the purposes of this calculation.

The Process

The present invention is directed to a process for the preparation of isotactic propylene polymer compositions comprising the steps of:

(a) prepolymerising a Ziegler-Natta type catalyst comprising a magnesium halide support, a titanium component and an internal donor (ID), wherein the internal donor is other than a phthalic ester and the Ziegler-Natta type catalyst is free from phthalic esters, in the presence of an aluminium alkyl co-catalyst and an external donor (ED), with a monomer (I) of the general formula $$CH_2{=}CH{-}CHR^1R^2 \quad (1)$$

wherein $R^1$ and $R^2$ are either individual alkyl groups with one or more carbon atoms or form an optionally substituted saturated, unsaturated or aromatic ring or a fused ring system containing 4 to 20 carbon atoms to obtain a catalyst composition (II) comprising 25 to 95 wt.-% of an isotactic polymer based on said monomer (I);

(b) mixing said catalyst composition (II) with a supported metallocene catalyst (III) suitable for the production of isotactic polypropylene in a weight ratio (II):(III) of 1:99 to 55:45 in an inert medium to obtain a catalyst blend (IV);

(c) using said catalyst blend (IV) for polymerising propylene and optionally one or more comonomers selected from ethylene and α-olefins containing 4 to 12 carbon atoms in one or more reaction steps to obtain an isotactic propylene homo- or copolymer (V);

(d) melt-mixing said isotactic propylene homo- or copolymer (V) with additives like antioxidants and acid scavengers and optionally a nucleating agent, followed by pelletisation.

Step c) may be a one or multi-stage polymerisation process for preparing isotactic propylene polymer compositions.

Any method for propylene polymerisation—for example, gas phase, bulk or slurry phase, solution polymerisation or any combination thereof—that is known for the polymerisation of propylene and optionally a comonomer in combination with the catalyst mixture, as described above, can be used.

Polymerisation can be a one stage or a two- or multi-stage polymerisation process, carried out in at least one polymerisation reactor. For two- or multi-stage processes different combinations can be used, e.g. gas-gas phase, slurry-slurry phase, slurry-gas phase processes; slurry-gas phase polymerisation being a preferred one. Any type of polymerisations as listed above are possible, however, slurry process being one preferred process for one stage processes.

In addition to the actual polymerisation, the process configuration can comprise any pre- or post reactors.

Preferably, the first step for producing the polypropylene compositions according to the present invention is a prepolymerisation step.

The prepolymerisation may be carried out in any type of continuously operating polymerisation reactor. Suitable reactors are continuous stirred tank reactors (CSTR), a loop reactor or a comparted reactor such as disclosed in WO 97/33920 or WO 00/21656 or a cascade of two or more reactors may be used.

Although the prepolymerisation may be carried out in a slurry polymerisation or a gas phase polymerisation, it is preferred to carry out the prepolymerisation as a slurry polymerisation, more preferably in a loop prepolymerisation reactor.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation is carried out in a continuously operating reactor at an average residence time of 5 minutes up to 90 min. Preferably the average residence time is within the range of 10 to 60 minutes and more preferably within the range of 15 to 45 minutes.

The prepolymerisation reaction is typically conducted at a temperature of 0 to 50° C., preferably from 10 to 45° C., and more preferably from 15 to 35° C.

The pressure in the prepolymerisation reactor is not critical but must be sufficiently high to maintain the reaction mixture in liquid phase and is generally selected such that the pressure is higher than or equal to the pressure in the subsequent polymerisation. Thus, the pressure may be from 20 to 100 bar, for example 30 to 70 bar.

In case a prepolymerisation step is performed, all of the catalyst mixture is introduced to the prepolymerisation step.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

A small amount of comonomer (ethylene and/or a $C_4$-$C_{10}$ alpha-olefin) may be introduced. The amount of comonomer is less than 5 weight % in order to avoid the occurrence of sticky particles which are caused by the reduced crystallinity of the prepolymer in the prepolymerised catalyst particles.

The reactants, catalyst mixture, propylene, comonomer, additives and the like, may be introduced in the prepolymerisation reaction or reactor continuously or intermittently.

Continuous addition is preferred to improve process stability. The prepolymerised catalyst may be withdrawn from the prepolymerisation reaction or reactor either continuously or intermittently. Again, a continuous withdrawal is preferred.

The precise control of the prepolymerisation conditions and reaction parameters is within the skill of the art.

The next step of the process for producing polypropylene compositions according to the present invention is preferably a slurry phase polymerisation step, i.e. in the liquid phase.

Slurry polymerisation is preferably a so-called bulk polymerisation. By "bulk polymerisation" is meant a process where the polymerisation is conducted in a liquid monomer essentially in the absence of an inert diluent. However, as it is known to a person skilled in the art, the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerisation, the inert components tend to accumulate, and thus the reaction medium may comprise up to 40 wt % of other compounds than monomer. It is to be understood, however, that such a polymerisation process is still within the meaning of "bulk polymerisation", as defined above.

The temperature in the slurry polymerisation is typically from 50 to 110° C., preferably from 60 to 100° C. and in particular from 65 to 95° C. The pressure is from 1 to 150 bar, preferably from 10 to 100 bar. In some cases it may be preferred to conduct the polymerisation at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be in the range from 1 to 8 hours, like from 1.5 to 4 hours.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerisation stage other components may also be introduced as it is known in the art. Thus, hydrogen is added to control the molecular weight of the polymer. Process additives may also be introduced into the reactor to facilitate a stable operation of the process.

If the slurry polymerisation stage is followed by gas phase polymerisation stages it is preferred to conduct the slurry directly into the gas phase polymerisation zone without a flash step between the stages. This kind of direct feed is described in EP-A-887379, EP-A-887380, EP-A-887381 and EP-A-991684.

The reaction product of the slurry phase polymerisation, which preferably is carried out in a loop reactor, is then optionally transferred to a subsequent gas phase reactor.

Thus the optional third step of a process for producing polypropylene compositions according to the present invention is preferably a gas phase polymerisation step.

The polymerisation in gas phase may be conducted in fluidised bed reactors, in fast fluidised bed reactors or in settled bed reactors or in any combination of these. When a combination of reactors is used then the polymer is transferred from one polymerisation reactor to another.

Furthermore, a part or whole of the polymer from a polymerisation stage may be returned into a prior polymerisation stage.

Typically the gas phase reactor is operated at a temperature within the range of from 50 to 100° C., preferably from 65 to 95° C. The pressure is suitably from 10 to 40 bar, preferably from 15 to 30 bar If desired, the polymerisation may be effected in a known manner under supercritical conditions in the slurry, preferably loop reactor, and/or as a condensed mode in the gas phase reactor.

Preferred multistage processes are slurry-gas phase processes, such as developed by *Borealis* and known as the Borstar® technology. In this respect, reference is made to EP 0 887 379 A1, WO 92/12182, WO 2004/000899, WO 2004/111095, WO 99/24478, WO 99/24479 and WO 00/68315 incorporated herein by reference.

A further suitable slurry-gas phase process is the Spheripol® process of LyondellBasell.

It is particularly preferred that the polymerisation step (c) involves a prepolymerisation step with propylene and optionally minor amounts of ethylene in liquid phase at a temperature of 15 to 35° C., followed by at least two main polymerisation steps in liquid phase and/or gas phase at a temperature of 65 to 95° C.

It is also preferred that the polymerisation step (c) does not involve the addition of any further external donor (ED), Ziegler-Natta co-catalyst (Co), or metallocene co-catalyst.

The melt-mixing step (d) is preferably performed in a continuous melt-mixing device, selected from the group of single-screw extruders, twin-screw extruders and co-kneaders, in a temperature range from 180 to 280° C.

The Isotactic Propylene Polymer Composition

The isotactic propylene polymer composition according to the present invention may, in its broadest sense, be any propylene polymer composition that is a reactor blend produced by the process described above.

All preferable embodiments of the process described above, whether with regard to the process features, or the features of the catalyst blend (IV), or the individual catalyst systems (II and III), are applicable mutatis mutandis for the isotactic propylene polymer composition produced by the process.

It is, however, preferred that the isotactic propylene polymer composition consists of:

(i) 45 to 99 wt.-%, relative to the total weight of the composition, of a metallocene-based homo- or copolymer, (ii) 1 to 55 wt.-%, relative to the total weight of the composition, of a Ziegler-Natta-based homo- or copolymer, (iii) 5 to 500 ppm by weight, relative to the total weight of the composition, of a polymeric nucleating agent formed in step (a), and (iv) up to 2.0 wt.-%, relative to the total weight of the composition, of other additives like antioxidants, acid scavengers, UV stabilizers, antistatic agents and non-polymeric nucleating agents.

It is further preferred that the isotactic propylene polymer composition consists of:

(i) 50 to 95 wt.-%, relative to the total weight of the composition, of a metallocene-based homo- or copolymer, (ii) 5 to 50 wt.-%, relative to the total weight of the composition, of a Ziegler-Natta-based homo- or copolymer, (iii) 5 to 500 ppm by weight, relative to the total weight of the composition, of a polymeric nucleating agent formed in step (a), and (iv) up to 2.0 wt.-%, relative to the total weight of the composition, of other additives like antioxidants, acid scavengers, UV stabilizers, antistatic agents and non-polymeric nucleating agents.

It is yet further preferred that the isotactic propylene polymer composition consists of:

(i) 60 to 95 wt.-%, relative to the total weight of the composition, of a metallocene-based homo- or copolymer, (ii) 5 to 40 wt.-%, relative to the total weight of the composition, of a Ziegler-Natta-based homo- or copolymer, (iii) 5 to 500 ppm by weight, relative to the total weight of the composition, of a polymeric nucleating agent formed in step (a), and (iv) up to 2.0 wt.-%, relative to the total weight of the composition, of other additives like antioxidants, acid scavengers, UV stabilizers, antistatic agents and non-polymeric nucleating agents.

It is even further preferred that the isotactic propylene polymer composition consists of:

(i) 60 to 90 wt.-%, relative to the total weight of the composition, of a metallocene-based homo- or copolymer,
(ii) 10 to 40 wt.-%, relative to the total weight of the composition, of a Ziegler-Natta-based homo- or copolymer,
(iii) 5 to 500 ppm by weight, relative to the total weight of the composition, of a polymeric nucleating agent formed in step (a), and
(iv) up to 2.0 wt.-%, relative to the total weight of the composition, of other additives like antioxidants, acid scavengers, UV stabilizers, antistatic agents and non-polymeric nucleating agents.

It is most preferred that the isotactic propylene polymer composition consists of:

(i) 65 to 80 wt.-%, relative to the total weight of the composition, of a metallocene-based homo- or copolymer,
(ii) 20 to 35 wt.-%, relative to the total weight of the composition, of a Ziegler-Natta-based homo- or copolymer,
(iii) 5 to 500 ppm by weight, relative to the total weight of the composition, of a polymeric nucleating agent formed in step (a), and
(iv) up to 2.0 wt.-%, relative to the total weight of the composition, of other additives like antioxidants, acid scavengers, UV stabilizers, antistatic agents and non-polymeric nucleating agents.

In each of the embodiments listed above, the combined weight of components (i) to (iv) adds up to 100 wt.-%.

The isotactic propylene polymer composition of the present invention preferably has a melt flow rate $MFR_2$ determined according to ISO 1133 at 230° C. and 2.16 kg load in the range of 10 to 500 g/10 min, more preferably in the range from 30 to 400 g/10 min, most preferably in the range from 50 to 300 g/10 min.

The isotactic propylene polymer composition of the present invention preferably has a comonomer content of up to 5.0 wt.-%, more preferably up to 3.0 wt.-%, most preferably up to 2.0 wt.-%.

Preferably the comonomer is ethylene.

The isotactic propylene polymer composition of the present invention preferably has an isotactic pentad regularity <mmmm> determined by $^{13}C$-NMR spectroscopy in the range of 96.0 to 99.9%, more preferably in the range from 97.0 to 99.0%, most preferably in the range from 97.5 to 98.0% The isotactic propylene polymer composition of the present invention preferably has a 2,1-regiodefect content in the range of 0.2 to 1.2 mol-%, more preferably in the range from 0.3 to 0.9 mol-%, most preferably in the range from 0.4 to 0.6 mol-%.

The isotactic propylene polymer composition of the present invention preferably has a xylene cold soluble (XCS) content as determined at 25° C. according to ISO 16152 in the range of 0.9 to 7.5 wt.-%, more preferably in the range from 1.0 to 6.0 wt.-%, most preferably in the range from 1.1 to 4.5 wt.-% The isotactic propylene polymer composition of the present invention preferably has a melting temperature $T_m$ in the range of 150 to 160° C., more preferably in the range from 151 to 159° C., most preferably in the range from 152 to 158° C.

The isotactic propylene polymer composition of the present invention preferably has a crystallisation temperature $T_c$ in the range of 120 to 132° C., more preferably in the range from 121 to 131° C., most preferably in the range from 122 to 130° C.

The isotactic propylene polymer composition of the present invention preferably has a difference between $T_m$ and $T_c$, ($T_m-T_c$), in the range of 15 to 35° C., more preferably in the range from 20 to 33° C., most preferably in the range from 25 to 31° C.

The isotactic propylene polymer composition of the present invention may alternatively have a difference between $T_m$ and $T_c$, ($T_m-T_c$), in the range of 15 to 31° C., more preferably in the range from 20 to 31° C., most preferably in the range from 25 to 31° C. Both $T_m$ and $T_c$ are determined by differential scanning calorimetry (DSC) according to ISO 11357/part 3/method C2 in a heat/cool/heat cycle with a scan rate of 10° C./min in the temperature range of −30 to +225° C.

The isotactic propylene polymer composition of the present invention preferably has a Flexural Modulus, determined according to ISO 178 on 80×10×4 $mm^3$ test bars injection moulded in line with EN ISO 1873-2, in the range from 1400 to 2200 MPa, more preferably in the range from 1500 to 2100 MPa, most preferably in the range from 1600 to 2000 MPa.

The isotactic propylene polymer composition of the present invention preferably has a Charpy Notched Impact Strength (NIS), measured according to ISO 179 leA at +23° C., using injection moulded bar test specimens of 80×10×4 $mm^3$ prepared in accordance with EN ISO 1873-2, in the range from 1.0 to 5.0 $kJ/m^2$, more preferably in the range from 1.2 to 4.0 $kJ/m^2$, most preferably in the range from in the range from 1.4 to 3.0 $kJ/m^2$.

The isotactic propylene polymer composition of the present invention preferably has a haze value, as determined according to ASTM D 1003 at a thickness of 1 mm, of less than 50%, more preferably of less than 35%, yet more preferably of less than 25% most preferably of equal to or less than 20%. The haze value determined under these conditions will normally be at least 5%.

The Article

The present invention is further directed to a film or molded article comprising at least 95 wt.-%, of the isotactic propylene polymer composition as described above.

More preferably the film or molded article comprises at least 97 wt.-%, even more preferably at least 99 wt.-% of the isotactic propylene polymer composition.

Most preferably, the film or molded article consists of the isotactic propylene polymer composition Preferably the molded article is an injection molded article that is characterised by a haze of less than 50% as determined according to ASTM D 1003 at a thickness of 1 mm, more preferably a haze of less than 35%, yet more preferably of less than 25%, most preferably of equal to or less than 20%.

All preferable embodiments of the isotactic propylene polymer compositions, or of the process, or the catalyst blend (IV), or the individual catalyst systems (II and III), are applicable mutatis mutandis for the present articles.

The use In an additional aspect, the present invention is directed to as use of a catalyst mixture comprising:

(a) 45 to 95 wt.-%, relative to the total weight of the catalyst mixture, of a metallocene catalyst (III) comprising (i) a metallocene complex of the general formula (VI)

Formula (VI)

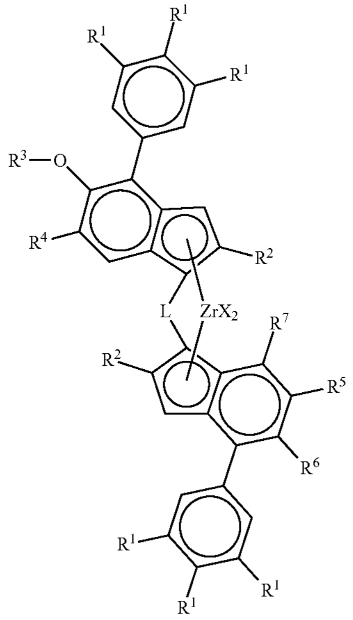

wherein each X independently is a sigma-donor ligand,

L is a divalent bridge selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom or a $C_1$-$C_{20}$-hydrocarbyl group optionally containing one or more heteroatoms from groups 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a $CH_2$—R group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a $C(R^9)_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table;

$R^6$ is hydrogen or an aliphatic $C_1$-$C_{20}$-hydrocarbyl group optionally containing one or more heteroatoms from groups 14-16 of the periodic table; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl group optionally containing one or more heteroatoms belonging to groups 14-16 of the periodic table;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a co-catalyst system comprising a boron containing co-catalyst and/or an aluminoxane co-catalyst, and (iii) a silica support, and (b) 5 to 55 wt.-%, relative to the total weight of the catalyst mixture, of a Ziegler-Natta-type catalyst composition (II), comprising i) a Ziegler-Natta type catalyst, comprising a magnesium halide support, a titanium component and an internal donor (ID), wherein the internal donor is other than a phthalic ester and the Ziegler-Natta type catalyst is free from phthalic esters;

ii) an aluminium alkyl co-catalyst;

iii) an external donor (ED)

wherein the Ziegler-Natta catalyst composition has been modified by polymerising a monomer (I) of the general formula $$CH_2{=}CH{-}CHR^1R^2 \qquad (I)$$

wherein $R^1$ and $R^2$ are either individual alkyl groups with one or more carbon atoms or form an optionally substituted saturated, unsaturated or aromatic ring or a fused ring system containing 4 to 20 carbon atoms, such that the Ziegler-Natta-type catalyst composition (II) contains from 25 to 95 wt.-% of an isotactic polymer based on said monomer (I)

for the production of an isotactic propylene homo- or copolymer composition having one or more, preferably all, of the following properties:

(i) a melt flow rate $MFR_2$ determined according to ISO 1133 at 230° C. and 2.16 kg load in the range of 5 to 500 g/10 min, (ii) a comonomer content of up to 6.0 wt.-%, the comonomer preferably being ethylene, (iii) an isotactic pentad regularity <mmmm> determined by $^{13}C$-NMR spectroscopy in the range of 96.0 to 99.9%, (iv) a 2,1-regiodefect content in the range of 0.2 to 1.2 mol.-%, and (v) a xylene cold soluble (XCS) content as determined at 25° C. according to ISO 16152 in the range of 0.9 to 9.0 wt.-%.

All preferable embodiments of the isotactic propylene polymer compositions, or of the process, or the catalyst blend (IV), or the individual catalyst systems (II and III), are applicable mutatis mutandis for the present use.

EXAMPLES

1. Definitions/Determination Methods:

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Differential Scanning Calorimetry (DSC) Differential scanning calorimetry (DSC) analysis, melting temperature ($T_m$) and melt enthalpy ($H_m$), and crystallisation temperature ($T_c$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallisation temperature ($T_c$) is determined from the cooling step, while melting temperature ($T_m$) and melt enthalpy (Hm) are determined from the second heating step.

Quantification of PP Matrix Microstructure by NMR Spectroscopy

Quantitative nuclear-magnetic resonance (NMR) spectroscopy was used to quantify the stereo-regularity (tacticity), the regio-regularity, and the comonomer content of the polymers.

Quantitative 13C {1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probe head at 125° C. using nitrogen gas for all pneumatics.

Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra. Quantitative 13C{1H} NMR spectra were processed, integrated and relevant quantitative properties determined from the integrals using proprietary computer programs. For polypropylene homopolymers all chemical shifts are internally referenced to the methyl isotactic pentad (mmmm) at 21.85 ppm. The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences. The isotacticity was determined at the pentad level and reported as the percentage of isotactic pentad (mmmm) sequences with respect to all pentad sequences:

$$[mmmm]\% = 100*(mmmm/\text{sum of all pentads}).$$

The presence of 2,1 erythro regio defects was indicated by the presence of the two methyl sites at 17.7 and 17.2 ppm and confirmed by other characteristic sites. Characteristic signals corresponding to other types of regio defects were not observed (Resconi, L., Cavallo, L., Fait, A., Piemontesi, F., Chem. Rev. 2000, 100, 1253). The amount of 2,1 erythro regio defects was quantified using the average integral of the two characteristic methyl sites at 17.7 and 17.2 ppm:

$$P_{21e} = (I_{e6} + I_{e8})/2.$$

The amount of 1,2 primary inserted propene was quantified based on the methyl region with correction undertaken for sites included in this region not related to primary insertion and for primary insertion sites excluded from this region:

$$P_{12} = I_{CH3} + I_{12e}$$

The total amount of propene was quantified as the sum of primary inserted propene and all other present regio defects:

$$P_{total} = P_{12} + P_{21e}$$

The mole percent of 2,1 erythro regio defects was quantified with respect to all propene:

$$[21e]\ \text{mol-}\% = 100*(P_{21e}/P_{total})$$

For the determination of the ethylene content, all chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E\ [\text{mol-}\%] = 100*fE$$

The weight percent comonomer incorporation was calculated from the mole fraction:

$$E\ [\text{wt.-}\%] = 100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T.

Macromolecules 15 (1982) 1150). This method was chosen for its robust nature and integration regions slightly adjusted to increase applicability to a wider range of comonomer contents.

Xylene Cold Soluble (XCS)

Xylene Cold Soluble fraction at room temperature (XCS, wt.-%) is determined at 25° C. according to ISO 16152; 5th edition; 2005 Jul. 1.

Flexural Modulus

The flexural modulus was determined in 3-point-bending at 23° C. according to ISO 178 on 80×10×4 $mm^3$ test bars injection moulded in line with EN ISO 1873-2.

Notched Impact Strength (NIS)

The Charpy notched impact strength (NIS) was measured according to ISO 179 leA at +23° C. or −20° C., using injection moulded bar test specimens of 80×10×4 $mm^3$ prepared in accordance with EN ISO 1873-2.

Intrinsic Viscosity

The intrinsic viscosity (iV) is measured according to DIN ISO 1628/1, October 1999, in Decalin at 135° C. For the present invention, the iV, iV(SF), iV(CF), and iV(XCS) were measured directly, whilst the iV(XCI) was calculated from the iV and iV(XCS) assuming validity of the following linear mixing rule, which has generally been found applicable for chemically similar polymers:

$$iV=(XCS/100\%)*iV(XCS)+(XCI/100\%)*iV(XCI)$$

Haze

The optical properties of the polypropylene (haze) were determined on plaques with dimensions 60×60×1 $mm^3$ produced by injection molding in line with EN ISO 1873-2 and measured according to ASTM D1003.

2. Experimental:

Catalysts Used:

a) Ziegler-Natta Catalysts a1) Super-BNT Phthalate-Containing Ziegler-Natta Catalyst The catalyst used as a1) was a transesterified Ziegler-Natta catalyst supported on magnesium chloride and prepared in accordance with the procedure of WO 92/19653, being identical to catalyst a4) of WO 2012/171745 A1.

In this catalyst, the internal donor is a phthalate, the ZN-C:VCH ratio is 1:5 and the external donor is di(cyclopentyl)dimethoxy silane (D-donor).

a2) BNT Phthalate-Free Ziegler-Natta Catalyst

The catalyst used as a2) was an emulsion-type Ziegler-Natta catalyst, being identical to of the catalyst employed in the polymerisation of the inventive examples of WO 2017/148970 A1.

In this catalyst, the internal donor is a citraconate, the ZN-C:VCH ratio is 1:1 and the external donor is di(cyclopentyl) dimethoxy silane (D-donor).

a3) Super-BNT Phthalate-Free Ziegler-Natta Catalyst

The catalyst used as a3) is identical to that of a2), with the exception that 15.0 g of vinylcyclohexane (VCH) were added in the modification step instead of the 5.0 g used for a2), resulting in a ratio of ZN-C:VCH of 1:3.

b) Metallocene Catalysts b1) Comparative Metallocene Catalyst

Catalyst b1 is rac-methyl(cyclohexyl)silanediyl bis(2-methyl-4-(4-tert-butylphenyl)indenyl)zirconium dichloride, which was prepared according to WO 2005 105863 A2, examples 17-18. Preparation of the self-supported active catalyst was achieved as described in WO 2012/171745 A1 for catalyst b1).

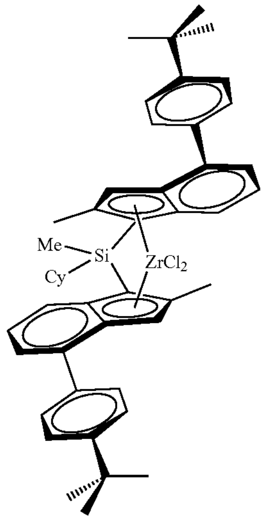

b2) Inventive Metallocene Catalyst

Catalyst b2 is Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in WO 2019/179959 A1 as MC-2. The supported metallocene catalyst was produced analogously to IE2 in WO 2019/179959 A1.

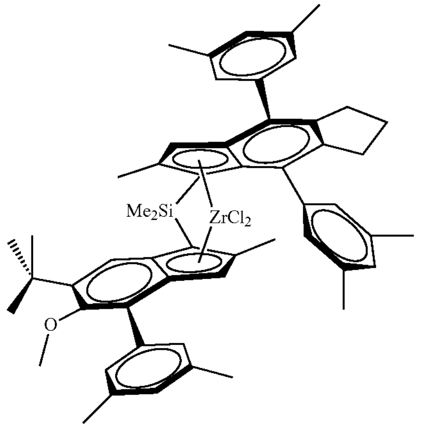

Inventive Examples IE1 to IE5 and Comparative Examples CE1 to CE5

Each of the inventive and comparative examples were prepared in a Borstar® Pilot Plant comprising a prepolymerisation reactor, a loop reactor and a gas phase reactor connected in series.

The following catalysts/catalyst blends were used:

IE1 to IE5: a 30:70 blend of catalysts a3) and b2)

CE1: catalyst a2)

CE2: catalyst a3)

CE3: catalyst b2)

CE4: a 10:90 blend of catalysts a1) and b1)

CE5: catalyst b1)

TABLE 1

Polymerisation conditions for Inventive and Comparative Examples

| | | CE1 | CE2 | CE3 | CE4 | CE5 | IE1 | IE2&3 | IE4&5 |
|---|---|---|---|---|---|---|---|---|---|
| R1 Prepolymerisation | | | | | | | | | |
| Temperature | [° C.] | 25 | 25 | 20 | 30 | 30 | 25 | 25 | 20 |
| Pressure | [kPa] | 5300 | 5300 | 5400 | 5100 | 5100 | 5200 | 5100 | 5400 |
| Catalyst feed | [g/h] | 2.5 | 2.5 | 2.5 | 5.1 | 4.3 | 3.2 | 2.7 | 4.0 |
| Donor feed | [g/t (C3)] | 40 | 40 | 0 | 0 | 0 | 0 | 0 | 0 |
| TEAL feed | [g/t (C3)] | 180 | 180 | 0 | 0 | 0 | 0 | 0 | 0 |
| Al/donor feed | [mol/mol] | 9 | 9 | — | — | — | — | — | — |
| Antifouling agent feed | [wt.-ppm] | 0.0 | 0.0 | 2.5 | 0.0 | 0.0 | 0.0 | 0.0 | 1.8 |
| H2/C3 ratio | [mol/kmol] | 0.0 | 0.27 | 0.06 | 0.15 | 0.15 | 0.05 | 0.05 | 0.05 |
| Residence time | [h] | 0.32 | 0.32 | 0.38 | 0.49 | 0.49 | 0.32 | 0.32 | 0.31 |
| R2 loop reactor | | | | | | | | | |
| Temperature | [° C.] | 94 | 70 | 75 | 69 | 65 | 70 | 70 | 70 |
| Pressure | [kPa] | 5500 | 5400 | 5400 | 5300 | 5300 | 5400 | 5400 | 5300 |
| H2/C3 ratio | [mol/kmol] | 15.70 | 10.91 | 0.42 | 1.20 | 1.40 | 1.71 | 0.48 | 0.37 |
| C2/C3 ratio | [mol/kmol] | 0.0 | 0.0 | 0.02 | 0.0 | 0.0 | 4.41 | 10.49 | 1.20 |
| Production rate | [kg/h] | 36.4 | 35.7 | 34.7 | 26.3 | 26.2 | 29.1 | 27.9 | 34.9 |
| Polymer split | [wt.-%] | 55 | 47 | 60 | 53 | 55 | 44 | 48 | 61 |
| Polymer residence time | [h] | 0.47 | 0.47 | 0.48 | 0.32 | 0.46 | 0.37 | 0.38 | 0.38 |
| $MFR_2$ | [g/10 min] | 127 | 142 | 66 | 2.9 | 1.5 | 600 | 81 | 83 |
| Total C2 content | [wt.-%] | 0.0 | 0.0 | 0.0 | 0.0 | 0.0 | 0.4 | 0.5 | 0.0 |
| XCS | [wt.-%] | 1.7 | 1.7 | 0.6 | 1.6 | 1.2 | 2.6 | 1.4 | 1.1 |
| Catalyst productivity after R2 | [kg/g] | 12.7 | 12.4 | 14.6 | 5.9 | 6.2 | 9.7 | 11.5 | 9.1 |
| Catalyst activity in R2 | [kg/g*h] | 33.3 | 32.5 | 36.2 | 29.3 | 29.1 | 24.3 | 31.3 | 22.4 |
| R3 gas phase reactor | | | | | | | | | |
| Temperature | [° C.] | 85 | 80 | 80 | 85 | 85 | 80 | 80 | 80 |
| Pressure | [kPa] | 2600 | 2500 | 2400 | 2900 | 3100 | 2500 | 2500 | 2500 |
| H2/C3 ratio | [mol/kmol] | 47.5 | 46.4 | 3.6 | 0.0 | 0.0 | 10.6 | 3.3 | 3.2 |
| C2/C3 ratio | [mol/kmol] | 0.0 | 0.0 | 0.0 | 0.0 | 0.0 | 6.8 | 18.9 | 0.0 |
| Polymer split | [wt.-%] | 45 | 53 | 40 | 47 | 45 | 56 | 52 | 39 |
| Total C2 content | [wt.-%] | 0.0 | 0.0 | 0.0 | 0.0 | 0.0 | 1.1 | 0.6 | 0.0 |
| XCS | [wt.-%] | 1.7 | 1.8 | 0.7 | 1.2 | 1.2 | 3.2 | 1.4 | 1.1 |
| Total productivity | [kg/g] | 32 | 31 | 23 | 12 | 11 | 18 | 19 | 14 |
| pVCH content | [ppm] | 16 | 24 | 0 | 6 | 0 | 11 | 11 | 16 |

HLZ:JN

TABLE 2

Properties of Inventive and Comparative Examples

| | | CE1 | CE2 | CE3 | CE4 | CE5 | IE1 | IE2 | IE3 | IE4 | IE5 |
|---|---|---|---|---|---|---|---|---|---|---|---|
| $MFR_2$ | [g/10 min] | 66 | 62 | 103 | 0.3 | 0.3 | 212 | 99 | 119 | 65 | 63 |
| C2 | [wt.-%] | 0.0 | 0.0 | 0.0 | 0.0 | 0.0 | 1.1 | 0.6 | 0.6 | 0.0 | 0.0 |
| <mmmm> | [%] | 95.5 | 95.5 | 98.5 | 95.6 | 97.3 | 97.9 | 97.9 | 97.9 | 97.9 | 97.9 |
| 2,1 regio-defects | [mol-%] | 0.0 | 0.0 | 0.6 | 0.6 | 0.8 | 0.5 | 0.5 | 0.5 | 0.5 | 0.5 |
| XCS | [wt.-%] | 1.7 | 1.8 | 0.8 | 1.2 | 1.2 | 3.9 | 2.6 | 2.8 | 1.3 | 1.6 |
| Tc | [° C.] | 128 | 130 | 114 | 123 | 116 | 126 | 122 | 125 | 126 | 129 |
| Tm | [° C.] | 166 | 166 | 155 | 155 | 153 | 157 | 152 | 153 | 157 | 158 |
| (Tm − Tc) | [° C.] | 38 | 36 | 41 | 32 | 37 | 31 | 30 | 28 | 31 | 29 |
| Hm | [J/g] | 117 | 118 | 105 | 110 | 102 | 117 | 104 | 108 | 111 | 114 |
| Flexural Modulus | [MPa] | 2110 | 2100 | 1530 | 1550 | 1350 | 1920 | 1610 | 1660 | 1800 | 1890 |
| NIS | [$KJ/m^2$] | 1.70 | 1.16 | 1.45 | 7.90 | 15.0 | 1.46 | 1.88 | 1.97 | 1.81 | 1.84 |
| Haze | [%] | 46 | 31 | 65 | 24 | 40 | 20 | 17 | 5 | 18 | 6 |

As can be seen from Table 2 and FIGS. 1 and 2, the balance of Flexural Modulus with Haze and Flexural Modulus with NIS is better for the inventive examples, which have been synthesised using a blend of catalysts a3 and b2, than for the polypropylenes that have been synthesised form either a3 or b2 alone (CE2 and CE3 respectively). These effects can be enhanced yet further through the addition of a nucleating agent (IE4 and IE5).

In addition to these features, the inventive examples are characterized by a beneficially low $T_m$–$T_c$ feature, which is particularly useful for application in molding, since it allows for a faster molding process wherein the molded article solidifies sooner.

Furthermore, when compared with an alternative catalyst blend (CE4), wherein the Ziegler-Natta catalyst uses a phthalate internal donor, the balance of Flexural Modulus and Haze is notably improved (i.e. lower Haze combined with higher Flexural Modulus). The NIS for CE4 is somewhat higher than for the inventive examples; however, this is hardly a surprising result, since it is well understood that high molecular weight polypropylenes (i.e. lower $MFR_2$) have higher impact strength.

In addition to the improved balance of Flexural Modulus and Haze, the productivity of the inventive catalyst blends is notably better than that of CE4, both after R2 and at the end of the polymerisation process.

The invention claimed is:

1. A process for the preparation of isotactic propylene polymer compositions comprising the steps of:

(a) prepolymerising a Ziegler-Natta type catalyst comprising a magnesium halide support, a titanium component and an internal donor (ID), wherein the internal donor is other than a phthalic ester and the Ziegler-Natta type catalyst is free from phthalic esters, in the presence of an aluminium alkyl co-catalyst and an external donor (ED), with a monomer (I) of the general formula $$CH_2{=}CH{-}CHR^1R^2 \quad (I)$$

wherein $R^1$ and $R^2$ are either individual alkyl groups with one or more carbon atoms or form an optionally substituted saturated, unsaturated or aromatic ring or a fused ring system containing 4 to 20 carbon atoms to obtain a catalyst composition (II) comprising 25 to 95 wt. % of an isotactic polymer based on said monomer (I);

(b) mixing said catalyst composition (II) with a supported metallocene catalyst (III) suitable for the production of isotactic polypropylene in a weight ratio (II):(III) of 1:99 to 55:45 in an inert medium to obtain a catalyst blend (IV), wherein the metallocene catalyst (III) comprises a metallocene complex, a co-catalyst system comprising a boron-containing co-catalyst and/or aluminoxane co-catalyst, and a silica support;

(c) using said catalyst blend (IV) for polymerising propylene and optionally one or more comonomers selected from ethylene and α-olefins containing 4 to 12 carbon atoms in one or more reaction steps to obtain an isotactic propylene homo- or copolymer (V); and (d) melt-mixing said isotactic propylene homo- or copolymer (V) with additives including at least one of antioxidants or acid scavengers and optionally a nucleating agent, followed by pelletisation.

2. The process according to claim 1, wherein the external donor (ED) in step (a) is a silane.

3. The process according to claim 1, wherein the internal donor (ID) of the Ziegler-Natta type catalyst of step (a) is a (di) ester of a non-phthalic carboxylic (di) acid.

4. The process according to claim 1, wherein monomer (I) is selected from vinyl cyclohexane, vinyl cyclopentane and 4-methylpent-1-ene.

5. The process according to claim 1, wherein the weight ratio (II):(III) of the catalyst composition (II) and the supported metallocene catalyst (III) in the catalyst blend (IV) formed in step (b) is in the range of 5:95 to 40:60.

6. The process according to claim 1, wherein the metallocene catalyst (III) comprises (i) a metallocene complex of the general formula (VI)

Formula (VI)

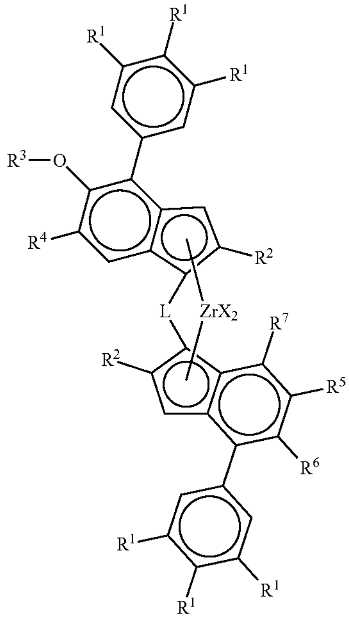

wherein each X independently is a sigma-donor ligand,

L is a divalent bridge selected from $-R'_2C-$, $-R'_2C-CR'_2-$, $-R'_2Si-$, $-R'_2Si-SiR'_2-$, $-R'_2Ge-$, wherein each R' is independently a hydrogen atom or a $C_1$-$C_{20}$-hydrocarbyl group optionally containing one or more heteroatoms from groups 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a $CH_2-R^8$ group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a $C(R^9)_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table;

$R^6$ is hydrogen or an aliphatic $C_1$-$C_{20}$-hydrocarbyl group optionally containing one or more heteroatoms from groups 14-16 of the periodic table; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl group optionally containing one or more heteroatoms belonging to groups 14-16 of the periodic table;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a co-catalyst system comprising a boron containing co-catalyst and/or an aluminoxane co-catalyst, and (iii) a silica support.

7. The process according to claim 1, wherein the polymerisation step (c) involves a prepolymerisation step with propylene and optionally minor amounts of ethylene in liquid phase at a temperature of 15 to 35° C., followed by at least two main polymerisation steps in liquid phase and/or gas phase at a temperature of 65 to 95° C.

8. The process according to claim 1, wherein the melt-mixing step (d) is performed in a continuous melt-mixing device, selected from the group of single-screw extruders, twin-screw extruders and co-kneaders, in a temperature range from 180 to 280° C.

9. An isotactic propylene polymer composition being a reactor blend produced in a process according to claim 1.

10. The isotactic propylene polymer composition according to claim 9, consisting of:

(i) 45 to 99 wt. %, relative to the total weight of the isotactic propylene polymer composition, of a metallocene-based homo- or copolymer, (ii) 1 to 55 wt. %, relative to the total weight of the isotactic propylene polymer composition, of a Ziegler-Natta-based homo- or copolymer, (iii) 5 to 500 ppm by weight, relative to the total weight of the isotactic propylene polymer composition, of a polymeric nucleating agent formed in step (a), and (iv) up to 2.0 wt. %, relative to the total weight of the isotactic propylene polymer composition, of other additives including at least one of antioxidants, acid scavengers, UV stabilizers, antistatic agents or nucleating agents, wherein the combined weight of components (i) to (iv) adds up to 100 wt. %.

11. The isotactic propylene polymer composition according to claim 9, having one or more of the following properties:

(i) a melt flow rate $MFR_2$, determined according to ISO 1133 at 230° C. and 2.16 kg load, in the range of 10 to 500 g/10 min, (ii) a comonomer content of up to 5.0 wt. %, (iii) an isotactic pentad regularity <mmmmm>, determined by $^{13}C$-NMR spectroscopy, in the range of 96.0 to 99.9%, (iv) a 2,1-regiodefect content in the range of 0.2 to 1.2 mol. %, and (v) a xylene cold soluble (XCS) content, as determined at 25° C. according to ISO 16152, in the range of 0.9 to 7.5 wt. %.

12. The isotactic propylene polymer composition according to claim 9, having one or more of the following properties:

(i) a melting temperature Tm in the range of 150 to 160° C., (ii) a crystallisation temperature Tc in the range of 120 to 132° C., and (iii) a difference between Tm and Tc, (Tm−Tc), in the range of 15 to 31° C., wherein both Tm and Tc are determined by differential scanning calorimetry (DSC) according to ISO 11357/part 3/method C2 in a heat/cool/heat cycle with a scan rate of 10° C./min in the temperature range of −30 to +225° C.

13. A film or molded article comprising at least 95 wt, % of an isotactic propylene polymer composition according to claim 9.

14. The molded article according to claim 13, being an injection-molded article wherein a haze of less than 50% as determined according to ASTM D 1003 at a thickness of 1 mm.

15. The process according to claim 1, wherein the external donor (ED) in step (a) is a silane of the general formula:

$$R^A_pR^B_qSi(OR^C)_{(4-p-q)}$$

wherein $R^A$, $R^B$ and $R^C$ denote a hydrocarbon group and wherein p and q are numbers ranging from 0 to 3 with their sum p+q being equal to or less than 3 and in which $R^A$, $R^B$ and $R^C$ can be chosen independently from one another and can be the same or different.

16. The process according to claim 1, wherein the internal donor (ID) of the Ziegler-Natta type catalyst of step (a) a diester of mono-unsaturated dicarboxylic acids.

17. The process according to claim 1, wherein the internal donor (ID) of the Ziegler-Natta type catalyst of step (a) is a maleate, citraconate, or cyclohexene-1,2-dicarboxylate.

18. The process according to claim 1, wherein the internal donor (ID) of the Ziegler-Natta type catalyst of step (a) is a citraconate.

* * * * *